United States Patent
Gaussier et al.

(10) Patent No.: US 7,457,808 B2
(45) Date of Patent: Nov. 25, 2008

(54) METHOD AND APPARATUS FOR EXPLAINING CATEGORIZATION DECISIONS

(75) Inventors: Eric Gaussier, Eybens (FR); Cyril Goutte, Le Versoud (FR)

(73) Assignee: Xerox Corporation, Norwalk, CT (US)

( * ) Notice: Subject to any disclaimer, the term of this patent is extended or adjusted under 35 U.S.C. 154(b) by 320 days.

(21) Appl. No.: 11/013,365

(22) Filed: Dec. 17, 2004

(65) Prior Publication Data

US 2006/0136410 A1    Jun. 22, 2006

(51) Int. Cl.
*G06F 17/30* (2006.01)
(52) U.S. Cl. ............... 707/100; 707/3; 707/104.01; 704/4; 704/9
(58) Field of Classification Search ............ None
See application file for complete search history.

(56) References Cited

U.S. PATENT DOCUMENTS

| | | | |
|---|---|---|---|
| 6,772,120 B1 * | 8/2004 | Moreno et al. | 704/256 |
| 6,858,007 B1 * | 2/2005 | Akselrod et al. | 600/437 |
| 7,130,837 B2 * | 10/2006 | Tsochantaridis et al. | 706/55 |
| 7,139,754 B2 * | 11/2006 | Goutte et al. | 707/4 |
| 2002/0059202 A1 * | 5/2002 | Hadzikadic et al. | 707/3 |
| 2003/0105863 A1 * | 6/2003 | Hegli et al. | 709/225 |
| 2005/0114313 A1 * | 5/2005 | Campbell et al. | 707/3 |
| 2006/0004747 A1 * | 1/2006 | Weare | 707/5 |

FOREIGN PATENT DOCUMENTS

EP    1679621 A1 *    7/2006

OTHER PUBLICATIONS

Janez Brank, Marko Grobelnik, Nataša Milic-Frayling, and Dunja Mladenic, "Feature selection using support vector machines", Microsoft Research Publication MSR-TR-2002-63, Jun. 2002 (also published in Proc. of the 3rd Int. Conf. on Data Mining Methods and Databases for Engineering, Finance, and Other Fields, Bologna, Italy, Sep. 2002).

Bernard Colin, "Information et analyse des données", in Pub. Inst. Stat. Univ. Paris. XXXVII(3-4):43-60, 1993.

Dempster, Laird and Rubin, "Maximum likehood from incomplete data via the EM algorithm", Journal of the Royal Statistical Society, Series B, 39(1), pp. 1-38, 1977.

Pavel B. Dobrokhotov, Cyril Goutte, Anne-Lise Veuthey Aimd Eric Gaussier, "Combining NLP and Probabilistic Categorisation for Document and term Selection for Swiss-Prot Medical Annotation", in Proceedings of ISMB-O3, Bioinformatics. vol. 19, Suppl 1, pp. 191-194, 2003.

(Continued)

*Primary Examiner*—Cam Y Truong
*Assistant Examiner*—Shyue Jiunn Hwa
(74) *Attorney, Agent, or Firm*—Fay Sharpe LLP

(57) ABSTRACT

Feature selection is used to determine feature influence for a given categorization decision to identify those features in a categorized document that were important in classifying the document into one or more classes. In one embodiment, model parameters of a categorization model are used to determine the features that contributed to the categorization decision of a document. In another embodiment, the model parameters of the categorization model and the features of the categorized document are used to determine the features that contributed to the categorization decision of a document.

19 Claims, 4 Drawing Sheets

OTHER PUBLICATIONS

Drucker, Wu, and Vapnik "Support Vector Machines for Spam Categorization", IEEE Trans. on Neural Networks, 10:5(1048-1054), 1999.

Ted Dunning, "Accurate methods for the statistics of surprise and coincidence", in Computational Linguistics, 19(1):61-74, 1993.

Eric Gaussier, Cyril Goutte, Kris Popat, and Francine Chen, "A hierarchical model for clustering and categorising documents", in Fabio Crestani, Mark Girolami, and Cornelis Joost van Rijsbergen, editors, Advances in Information Retrieval Proceedings of the 24th BCS-IRSC European Colloquium on JR Research, vol. 2291 of Lecture Notes in Computer Science, pp. 229-247, Springer, 2002.

Gaussier, Eric, Jean-Michel Renders, Irina Matveeva, Cyril Goutte, Hervé Déjean, "A Geometric view on billingual lexicon extraction from comparable corpora", 42nd Annual Meeting of the Association for Computational Linguistics, Barcelona, Spain, Jul. 25-26, 2004.

Cyril Goutte, Pavel Dobrokhotov, Eric Gaussier, Anne-Lise Veuthey, "Corpus-Based vs. Model-Based Selection of Relevant Features", in Proceedings of CORIA04, Toulouse, France, Mar. 10-12, pp. 75-88, 2004.

Mladenic, D., Brank, J., Grobelnik, M., and Milic-Frayling, N, "Feature Selection using Linear Classifier Weights: Interaction with Classification Models", SIGIR 2004, pp. 234-241, Jul. 25-29, 2004.

Sahami, M., Dumais, S., Heckerman, D., and Horvitz, E. "A bayesian approach to filtering junk e-mail", in Learning for Text Catergorization: Papers from the 1998 AAAI Workshop, 1998.

Yinming Yang and Jan O. Pedersen, "A comparative study on feature selection in text categorization", in Proceedings of ICML-97, 14th International Conference on Machine Learning, pp. 412-420, 1997.

U.S. Appl. No. 10/774,966, entitled "Method for Multi-Class, Multi-Label Categorization Using Probabilistic Hierarchical Modeling".

U.S. Appl. No. 10/976,847, entitled "Method and Apparatus for Identifying Bilingual Lexicons in Comparable Corpora".

European Search Report for EPO counterpart Application No. EP 05 25 7572, Mar. 20, 2006.

* cited by examiner

METHOD AND APPARATUS FOR EXPLAINING CATEGORIZATION DECISIONS

BACKGROUND AND SUMMARY

The following relates generally to methods, and apparatus therefor, for categorizing documents, and more particularly to a method and apparatus for explaining categorization decisions.

Categorizers, such as statistical categorizers, may be deployed with relative ease if the appropriate amount of pre-processed data exists. For example, learning model parameters of a statistical categorizer on a new collection of several thousand documents may take on the order of minutes to hours depending on the amount of pre-processing required. Such preprocessing may, for example, include any required document transformations and/or linguistic processing and/or annotation associated therewith.

Examples of statistical categorizers include Naïve Bayes, Probabilistic Latent Categorization (PLC), and Support Vector Machines (SVM). The use of Naïve Bayes, PLC, and SVM, for categorization is disclosed in the following publications respectively (each of which is incorporated herein by reference) by: Sahami et al., in a publication entitled "A Bayesian approach to filtering spam e-mail, Learning for Text Categorization", published in Papers from the 1998 AAAI Workshop; Gaussier et al. in a publication entitled "A Hierarchical Model For Clustering And Categorizing Documents", published in F. Crestani, M. Girolami and C. J. van Rijsbergen (eds), Advances in Information Retrieval—Proceedings of the $24^{th}$ BCS-IRSG European Colloquium on IR Research, Lecture Notes in Computer Science 2291, Springer, pp. 229-247, 2002; and Drucker et al., in a publication entitled "Support Vector Machines for Spam Categorization", IEEE Trans. on Neural Networks, 10:5(1048-1054), 1999.

A problem that exists when using statistical and other categorizers is that the one or more features (e.g., words) that influence a categorization decision are often difficult to understand (i.e., assess why the categorizer selected one particular class instead of another in categorizing a document). More specifically, before a categorization decision is made, a document is initially decomposed into a set of features (or terms). The set of features is input into the categorizer and a score is output for each category (or class), with the highest scored category being the categorization decision. Exactly which ones of the features in the set of features influenced the computation of each score is difficult to assess as each score may be influenced by thousands of different features.

Known methods for solving this problem rely on either non-parametric or model-based approaches to identify the most relevant features. Examples of such approaches are described by Goutte et al., in "Corpus-Based vs. Model-Based Selection of Relevant Features", Proceedings of CORIA04, Toulouse, France, March, 2004, pp. 75-88, and Dobrokhotov et al., in "Combining NLP and Probabilistic Categorisation for Document and term Selection for Swiss-Prot Medical Annotation", Proceedings of ISMB-03, Bioinformatics. vol. 19, Suppl 1, pages 191-194, 2003, both of which are incorporated herein by reference. However, such known methods tend to be unable to explain a particular categorization decision (i.e., identify those features used to make a categorization decision), and tend to lead to the paradoxical conclusion that the importance of a feature in categorizing a document is independent of its frequency. Accordingly it would be advantageous to provide an improved method for more accurately assessing which features are relied on by a categorizer when computing the score for each category in assessing the categorization decision.

In accordance with the various embodiments, there is provided a method, and apparatus, for explaining a categorization decision. In the method, a score is computed for each of a plurality of classes using model parameter values of a selected categorization model and feature values of a document to be categorized. In addition in the method, a contribution is computed for each of a plurality of features in the document, where the contribution of a selected feature is computed using model-independent, model-dependent, or document-dependent feature selection. A categorization decision is specified using at least the class with the highest score, and an importance is assigned to each of a plurality of the features using the computed contributions to identify for different ones of the plurality of features, their influence on the categorization decision.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

Figure 1:
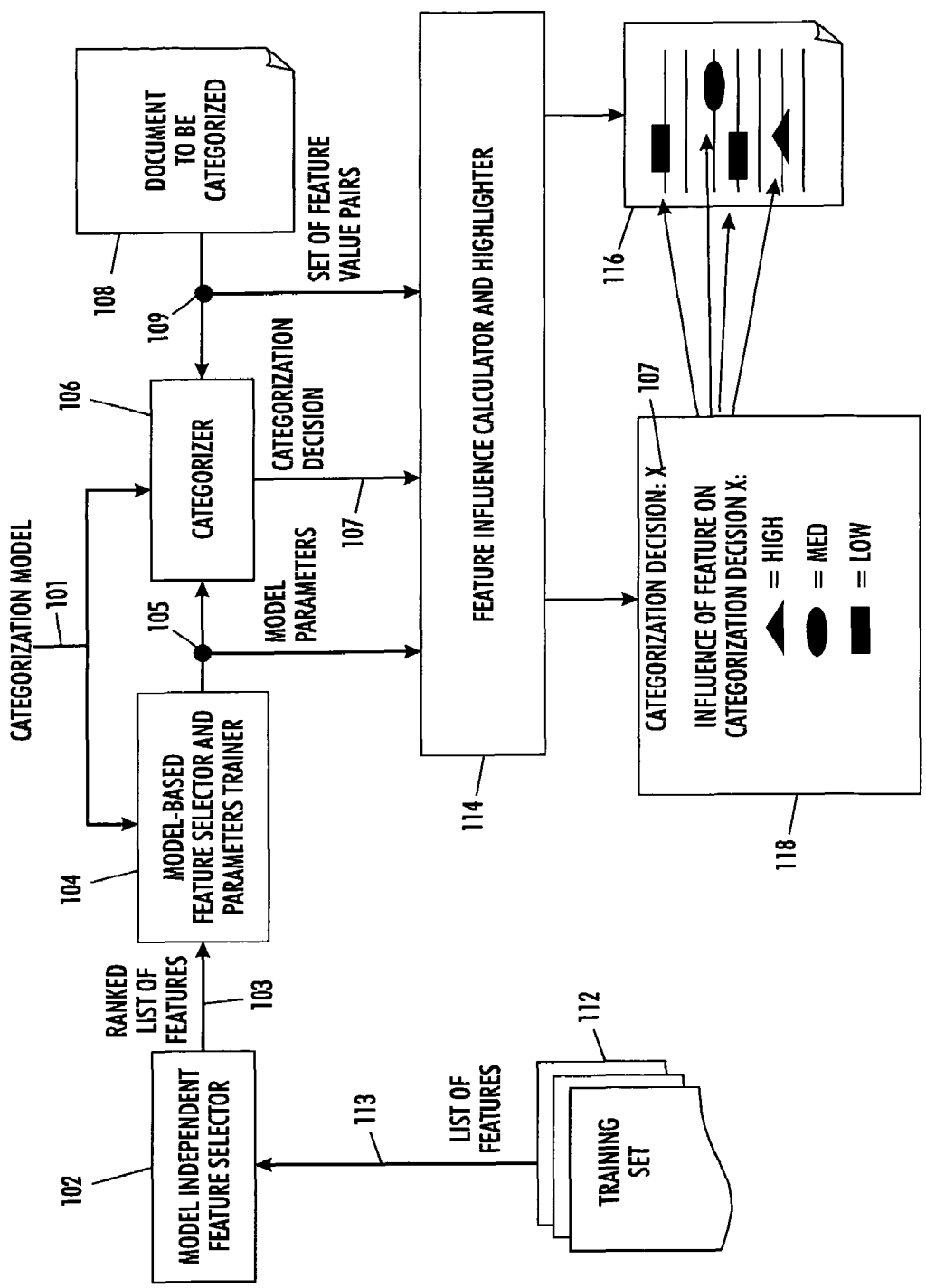
FIG. 1 illustrates a first embodiment of a system for explaining a categorization decision using document-based feature selection.

The table that follows set forth definitions of terminology used throughout the specification, including the claims.

| Term | Definition |
| --- | --- |
| feature | quantifiable qualities of the content of a document (e.g., frequency of occurrence of a word or term in a document) |
| class (or category) | a label assigned to a feature |
| PLC | Probabilistic Latent Categorizer |
| SVM | Support Vector Machines |

A. Overview

FIGS. 1-2 and 3-4 illustrate two embodiments for explaining a categorization decision 107 of a classification system or categorizer 106. The goal of the classification system 106 in each embodiment is to produce the categorization decision 107 to classify a document 108 into a set of one or more classes (or category labels), which are also referred to as categories. In operation, the categorizer 106 assigns the document 108 one or more classes in a set of classes that may, for example, be defined in an ontology such as the DMOZ ontology (see dmoz.org).

A document 108 input for classification to the categorizer 106 is preprocessed to transform its contents into a set of features and associated values (or weights) 109, otherwise referred to herein as a set of feature value pairs. Different combinations of known techniques from natural language processing such as translation of HTML to text, tokenization, stemming, stop word removal, parsing techniques, and entity recognition may be used to generate the sets of feature. In one embodiment, the document 108 (to be categorized) may be preprocessed using a number of components such as an HTML to text converter, a tokenizer, a stemmer, a grammar-based feature generator, a feature generator, a word frequency analyzer, and a noun phrase analyzer (or extractor) to produce the features of the set of feature value pairs 109.

The value (or weight) associated with each feature of the pairs 109 of the document 108 may be calculated using any of a number of well known techniques, varying from a normalized frequency count to more sophisticated weighting schemes that calculate values based upon an aggregation of a number of measures such as the frequency of each feature in the document, its location in a document, the frequency of each feature in a reference corpus, and the inverse document frequency of the feature. In one example embodiment, the document 108 is preprocessed into a list of tokens that is delimited by spaces, while removing tokens that correspond to stop words (i.e., words that do not improve the quality of the categorization). The remaining tokens in the list are then stemmed using Porters stemming algorithm, while again removing stop words, resulting in a list of features (i.e., terms or words). Finally, this list of features is transformed into a frequency distribution consisting of <feature, frequency> tuples where frequency denotes the number of occurrences of that feature in the document to define the set of feature value pairs 109.

The categorizer 106 processes the set of feature value pairs 109 using model parameters 105 associated with a selected categorization model 101, such as Naïve Bayesian, PLC, or SVM, to produce a categorization decision 107. A list of features 113 from a training set 112 is processed initially by a model independent feature selector 102 to provide features and associated values 103 (i.e., a ranked list of features). Subsequently, the ranked list of features 103 is processed by a model-based feature selector and parameter trainer 104 to define model parameters 105 for the selected categorization model 101 that is used by the categorizer 106 to model a mapping between the transformed representation 109 of the document 108 and different classes of an ontology. The mapping or mappings with the highest scores result in the categorization decision 107.

More specifically, the categorizer 106 assigns a class (i.e., categorization decision 107) to the document to be categorized "d" by computing a score s(c,d) for each possible class "c", where c is from the set of possible classes $\{c_1, c_2, c_3, \ldots c_n\}$. In one embodiment, the computed score "s" of the selected probabilistic model 101 is PLC, which is based on the class-posterior probability s(c,d)=P(c|d) (i.e., the categorizer computes a posterior probability distribution P over all possible classes c given a description of the document d). The categorizer 106 will then assign the class (or classes) with the highest class-posterior probability (i.e., score) as the categorization decision 107. The computed score s(c,d) is based on a (possibly large) number of features in the set of feature-value pairs 109 of the document 108.

Feature selection, which concerns operations for identifying those features that are most important or most relevant in making a categorization decision (i.e., feature influence), is an important step in computing the model parameters 105 of the selected categorization model. Depending on the embodiment, feature selection may take place before and/or after the model parameters 105 are estimated or after the computation of the categorization decision 107. Model-independent feature selection takes place before estimating the model parameters 105 to limit the number of features that are to be modeled. Model-dependent features selection takes place after estimating model parameters 105 to analyze the selected categorization model 101 and remove unnecessary model parameters, thereby improving a model's ability to generalize. Document-based feature selection takes into account the features 109 of a document 108 used in computing its categorization decision 107.

In accordance with the various embodiments described in further detail below, feature selection is used to determine feature influence (or feature relevance) for a given categorization decision, and thereby identify (i.e., highlight) features in the document that (highly) influence a given categorization decision. That is, determining feature influence allows relevant features in a document to be identified in order to explain a categorization decision or provide assistance in making a decision on subsequent processing of the document (e.g., routing, etc.). In the embodiment shown in FIGS. 1-2, document-based feature selection is used to determine feature influence, and in the embodiment shown in FIGS. 3-4, model-independent or model-dependent feature selection is used to determine feature influence. Each method for determining feature influence is examined below in order from the most general to the most specific method of feature selection: model-independent, model-dependent, and document-based.

B. Model-Independent Feature Selection

The model-independent approach described in this section evaluates feature influence independent of the categorization model 101. In order to evaluate the influence of a feature independently of any underlying model, the "independence" of the feature and class are evaluated. In a simplified embodiment (i.e., binary method), the feature and the class are represented using binary variables that indicate whether the feature f is present in the document (f∈{0,1}) and whether the document belongs to the class c (c∈{0,1}). This relationship is between the feature variables and class variable c is represented in Tables 1 and 2, where Table 1 sets forth observed frequencies and Table 2 sets forth underlying probabilities.

TABLE 1

|       | c = 0 | c = 1 |       |
|-------|-------|-------|-------|
| f = 0 | A     | B     | A + B |
| f = 1 | C     | D     | C + D |
| Total | A + C | B + D | N     |

TABLE 2

|       | c = 0          | c = 1          |          |
|-------|----------------|----------------|----------|
| f = 0 | P(f = 0, c = 0)| P(f = 0, c = 1)| P(f = 0) |
| f = 1 | P(f = 1, c = 0)| P(f = 1, c = 1)| P(f = 1) |
| Total | P(c = 0)       | P(c = 1)       | 1        |

If the feature variable and the class variable are independent (i.e., the feature is irrelevant), then the probabilities should reflect this independence as P(f,c)=P(f)P(c). One method for measuring the relevance of a feature in accordance with this method is to compute the information gain (IG) as follows:

$$IG(f) = \sum_f \sum_c P(f, c) \ln\left(\frac{P(f, c)}{P(f)P(c)}\right),$$

where large values of IG(f) indicate that feature f is very relevant for (i.e., brings a lot of information to) making the categorization decision 107. Additional background on the computation of an information gain is disclosed by Bernard Colin, "Information Et Analyse Des Données", in Pub. Inst. Stat. Univ. Paris, XXXVII(3-4):43-60, 1993, which is incorporated herein by reference.

Alternate frequency-based methods may be used to achieve a similar result by, for example, relying on likelihood ratio statistics or chi-squared statistics (i.e., $\chi^2$), which may be extended to the case where the feature f is a discrete variable containing counts, and the class c is a discrete index over classes (instead of simple counts). Such frequency-based methods examine the frequency distribution for all of the features and may be most useful to examine query based results (i.e., documents that are identified by a set of keywords). In such cases, the existence (i.e., absence or presence) of a query term, as well as, its frequency in the document are used to assess the importance of a feature in a document. Additional background concerning likelihood statistics is disclosed by Ted Dunning, "Accurate Methods For The Statistics Of Surprise And Coincidence" (in Computational Linguistics, 19(1):61-74, 1993) and by Yinming Yang and Jan Pedersen, "A Comparative Study On Feature Selection In Text Categorization" (in Proceedings of ICML-97, 14th International Conference on Machine Learning, pages 412-420, 1997), which are both incorporated herein by reference.

C. Model-Dependent Feature Selection

The model-dependent approach described in this section evaluates feature influence with respect to the selected categorization model 101. That is, the model-dependent approach identifies those features important to a model when it makes a categorization decision. This section follows with a discussion for explaining categorization decisions made with model-dependent selection for three different categorization models. Further details are disclose by Goutte et al., in "Corpus-Based vs. Model-Based Selection of Relevant Features", Proceedings of CORIA04, Toulouse, France, March, 2004, pp. 75-88, which is incorporated herein by reference.

C.1 Linear Models

For linear models, the score s(c,d) of a document d for each possible class c, where c is from the set of possible classes $\{c_1, c_2, c_3, \ldots c_n\}$ is given by:

$$s(c, d) = w^c \cdot x = \sum_f w_f^c x_f,$$

which is a weighted linear combination of the feature values $x_f$, with the weight vector $w^c$ for each class c, where $w_f^c$ is the model parameter value for the feature f in the class c. The importance of a feature f for categorization in class c is directly related to its weight $w_f^c$. In order to take the magnitude of this feature into account and remain scale invariant, $w_f^c$ is multiplied by the standard deviation $\sigma_f$ of feature value $x_f$. This yields the scaled regression coefficient, which may be used to calculate the contribution $\epsilon_f$ of feature f to a categorization decision:

$$\epsilon_f = \hat{w}_f^c = w_f^c \sigma_f,$$

$\sigma_f$ is the standard deviation of the feature f, and if each feature f is independent, it may be shown that $$\sum_f \hat{w}_f^c = \text{var}(s(c, d))$$

(i.e., the scaled regression coefficient provides a natural additive decomposition of the variance of the score s).

C.2 Naïve Bayes Models

For Naïve Bayes models, the score s(c,d) for a document d is given by the class c posterior as:

$$s(c,d) = P(c|d) = P(c)P(d|c).$$

The Naïve Bayes assumption provides that all features f are independent of its target class c, to simplify the computation of the probability distribution P over class c given a description of the document d as:

$$P(d \mid c) \propto \prod_f P(f \mid c)^{x_f},$$

where $x_f$ is the frequency of the feature f in document d. Assuming a binary classification into two classes $c_0$ and $c_1$, the maximum posterior decision (i.e., the categorization decision) may be determined by examining the sign of the log-ratio $\ln(P(c_0|d)/P(c_1|d))$. All proportionality factors of the log-ratio are independent of the class c and disappear, to yield:

$$\ln\frac{P(c_0|d)}{P(c_1|d)} = \sum_f x_f \ln\left(\frac{P(f|c_0)}{P(f|c_1)}\right) + \ln\left(\frac{P(c_0)}{P(c_1)}\right),$$

which in terms of the feature values $x_f$ is a linear model, where the constant $\ln(P(c_0)/P(c_1))$ models a possible bias in favor of one of the classes $c_0$ and $c_1$, while the linear coefficients are given by $\ln(P(f|c_0)/P(f|c_1))$ with features f for class $c_0$ and $c_1$. This formulation of the maximum posterior decision is similar to the linear models and provides that the contribution $\epsilon_f$ of feature f to a categorization decision may be given by:

$$\epsilon_f = \ln\frac{P(f|c_0)}{P(f|c_1)}.$$

C.3 SVM Models

Under the vector-space model, a document can be conceptually viewed as a vector of features, such as words, noun phrases, and other linguistically derived features (e.g., parse tree features). For non-linear SVM models, the score s(c,d) for a document d may be computed for SVM models using a linear model by extracting linear parameters from the implicit feature space of polynomial kernels without explicitly performing feature space expansion. A solution is presented below for the quadratic kernel $K_2(x,y) = (1+\langle x,y \rangle)^2$ which those skilled in the art will appreciate may be extend to any polynomial kernel $K_p(x,y) = (1+\langle x,y \rangle)^p$.

In the quadratic kernel $K_2(x,y) = (1+\langle x,y \rangle)^2$, similar to all kernels, $K_2$ corresponds to performing a scalar product in an implicit feature space $K_2(x,y) = \langle \phi(x), \phi(y) \rangle$. For the quadratic kernel $K_2$, the implicit feature space of the original feature space $x=[x_1 \ldots x_M]$, which has $1+M(M+3)/2$ dimensions, is given by:

$$\phi(x) = \begin{pmatrix} 1 \\ \sqrt{2}\,x_1 \\ \vdots \\ \sqrt{2}\,x_M \\ x_1^2 \\ \vdots \\ x_M^2 \\ \sqrt{2}\,x_2 \\ \vdots \\ \sqrt{2}\,x_i x_j \\ \vdots \\ \sqrt{2}\,x_{M-1} x_M \end{pmatrix},$$

which may be verified using the expansion $\langle \phi(x), \phi(y) \rangle = (1+\langle x, y \rangle)^2$.

The decision function for the quadratic kernel is given by $$f(x) = \sum_i \alpha^{(i)} K_2(x, x^{(i)}) = \langle w, \phi(x) \rangle,$$

where $x^{(i)}$ are the training examples of weight $\alpha^{(i)}$ (where $\alpha^{(i)} \neq 0$ for support vectors only) and w is the parameter vector in the implicit feature space $\phi(x)$ that may be given by:

$$w = [w_0, w_1\, w_i\, w_M, w_{11}, w_{ii}\, w_{MM}, w_{12}\, w_{ij}\, w_{M-1,M}].$$

The polynomial kernel plays a special role, in particular in text categorization, because most of implicit features correspond to combinations of single features $\sqrt{2}\,x_i x_j$. If $x_i$ and $x_j$ are the frequencies of feature i and feature j in a document, then this combination of single features is (up to the $\sqrt{2}$) the number of ways to select a pair of features (i.e., feature i and feature j) in the document.

In model-based feature selection, the importance $\epsilon_f$ of a feature f in a linear model is related to the corresponding weight w given to the feature (i.e., $\epsilon_f \approx w_f$ for a given feature f). Denoting by "0" the "null" vector, and "$1_i$" the vector in the input space which has its "$i^{th}$" coordinate set to "1" and all other coordinates set to "0", provides that:

$$f(0) = w_0,$$

$$f(1_i) = w_0 + \sqrt{2}\,w_i + w_{ii},$$

$$f(-1_i) = w_0 - \sqrt{2}\,w_i + w_{ii},$$

$$f(1_i + 1_j) = w_0 + \sqrt{2}\,w_i + \sqrt{2}\,w_j + w_{ii} + w_{jj} + \sqrt{2}\,w_{ij},$$

as a consequence, the weights $w_0, w_i, w_{ii}, w_{ij}$ and importance $\epsilon_f$ may be obtained as (where $w_j$ and $w_{jj}$ are treated similar to $w_i$ and $w_{ii}$, respectively):

$$w_0 = f(0),$$

$$\epsilon_i = w_i = \frac{1}{2\sqrt{2}}(f(1_i) - f(-1_i)),$$

$$\epsilon_{ii} = w_{ii} = \frac{1}{2}(f(1_i) + f(-1_i)) - f(0),$$

$$\epsilon_{ij} = w_{ij} = \frac{1}{\sqrt{2}}(f(1_i + 1_j) - f(1_i) - f(1_j) + f(0)),$$

where $\epsilon_i$ is the frequency contribution from feature $f_i$, $\epsilon_{ii}$ is the squared contribution from feature $f_i$, and $\epsilon_{ij}$ is the contribution from the combination of features $f_i$ and $f_j$, and where i and j are any two features in the original features space.

Accordingly, the implicit linear parameters corresponding to any feature combination (e.g., single features, squared features, or product features) may be estimated without performing the actual expansion into feature space. Those skilled in the art will appreciate that given the linear coefficients are scaled by the standard deviation of the corresponding feature to estimate their importance, this standard deviation may be implicitly calculated. However, while the usefulness of a feature may be estimated as set forth above, searching for the best feature among a large number of candidates may be computationally restrictive. In one embodiment, the search for the best feature is limited to those features represented in the support vectors and combinations thereof to reduce the computational complexity (e.g., if M=10000 features, the implicit space will have $1+M(M+3)/2=50015001$ features, only a few of which are used by the support vectors).

C.4 PLC Models

The PLC is a probabilistic model of the co-occurrence of features f and document d:

$$P(d, f) = \sum_c P(c) P(d \mid c) P(f \mid c),$$

where the influence of a feature f in a class c is reflected by the probability $P(f|c)$. That is, each class c has its own class-conditional feature distribution $P(f|c)$. Each term distribution may be compared to find features that have different importance for different classes. For example, if $P(f|c_0) \gg P(f|c_1)$ (i.e., the probability of the presence of the feature is much greater that its absence in a given class $c_0$ versus class $c_1$) then the presence of this feature in a document will be a strong indicator that it is relevant to the class. The difference between two probability distributions over the same event space may be evaluated using the symmetrized Kullback-Leibler (KL) divergence, which is given by:

$$KL(P(f|c_0), P(f|c_1)) = \sum_f \underbrace{(P(f|c_0) - P(f|c_1)) \ln\left(\frac{P(f \mid c_0)}{P(f \mid c_1)}\right)}_{\epsilon_f},$$

where the divergence is zero iff both distributions are equal (i.e., $KL(P(f|c_0), P(f|c_1))=0$ iff $P(f|c_0)$ and $P(f|c_1)$ are identical), and where $\epsilon_f$ is the importance of the contribution of feature f to a categorization decision (which is given by a natural additive decomposition of the divergence in feature-dependent terms $\epsilon_f$ as disclosed in by Dobrokhotov et al., in "Combining NLP and Probabilistic Categorisation for Document and term Selection for Swiss-Prot Medical Annotation", Proceedings of ISMB-03, Bioinformatics. vol. 19, Suppl 1, pages 191-194, 2003). The larger the importance of contribution of the greater the importance of feature f in differentiating between classes. The KL divergence may be extended to evaluate multiple classes by considering the KL divergence between each conditional feature distribution and their average P(f).

D. Document-Based Feature Selection

The document-based approaches described in this section evaluate feature influence while taking into account the categorized document. That is, the document-based approaches concern a method for identifying those features in a particular document that support a model's categorization decision in one class rather than another.

D.1 Linear And Naïve Bayes Models

For linear models, including Naïve Bayes models, the score s(c,d) which is a function of document d and class c is given by $$s(c, d) = \sum_f w_f^c x_f,$$

which provides a natural additive decomposition of the score s(c,d) in feature-dependent terms of $\epsilon_f(c) = w_f^c x_f$. Therefore, the influence of a feature on one class compared to another may be evaluated using the score difference $s(c_1,d) - s(c_2,d)$ as a decision function in which the contribution $\epsilon_f$ of a selected feature f is a function of the product of its corresponding value and the difference between the model parameter values of different classes of the selected feature. The decision function, which provides that features with the largest positive contributions tend to classify the current document in a given class that may then be, for example, highlighted in the current document to identify it as a feature that influenced the document's categorization decision, may be defined as:

$$\sum_f \epsilon_f = s(c_1, d) - s(c_2, d) = \sum_f w_f^{c_1} x_f - \sum_f w_f^{c_2} x_f = \sum_f \underbrace{(w_f^{c_1} - w_f^{c_2}) x_f}_{\epsilon_f},$$

where:

$\epsilon_f$ is the contribution of feature f to a categorization decision;

$c_n$ is a class n in which the document may be categorized;

d is the document being categorized;

$s(c_n, d)$ is the score of the category $c_n$ as it depends on a feature value x;

$x_f$ is the feature value associated with the document for the feature f;

$w_f^c$ is the model parameter value for the feature f in the class c.

D.2 SVM Models

For SVM models, the decision function is given as $$f(x) = \sum_k w_k \phi_k(x),$$

where k loops over all dimensions of the implicit feature space, i, ii, and ij. To find the important features in a document that support or oppose a given categorization decision, the influence of a feature is evaluated by its contribution $w_k \phi_k(x)$ to the decision function f(x). Large positive contributions to the decision function f(x) will tend to "push" the categorization decision more towards one class rather than another. Conversely, large negative contributions have the reverse effect. Following similar computational techniques as those set forth above in section C.3, it follows that:

$$f(0) = w_0$$

$$f(x_i 1_i) = w_0 + \sqrt{2} w_i x_i + w_{ii} x_i^2$$

$$f(-x_i 1_i) = w_0 + \sqrt{2} w_i x_i + w_{ii} x_i^2$$

$$f(x_i 1_i + x_j 1_j) = w_0 + \sqrt{2} w_i x_i + \sqrt{2} w_i x_j + w_{ii} x_i^2 + w_{jj} x_j^2 + \sqrt{2} w_{ij} x_i x_j$$

and as a consequence the values $\sqrt{2} w_i x_i$, $w_{ii} x_i^2$, and $\sqrt{2} w_{ij} x_i x_j$, and the importance $\epsilon_f$ may be obtained as:

$$\epsilon_i = \sqrt{2} w_i x_i = \frac{1}{2}(f(x_i 1_i) - f(-x_i 1_i)),$$

$$\epsilon_{ii} = w_{ii} x_i^2 = \frac{1}{2}(f(x_i 1_i) + f(-x_i 1_i)) - f(0),$$

$$\epsilon_{ij} = \sqrt{2} w_{ij} x_i x_j = (f(x_i 1_i + x_j 1_j) - f(x_i 1_i) - f(x_j 1_j) + f(0)),$$

where $\epsilon_i$ is the frequency contribution from feature $f_i$, $\epsilon_{ii}$ is the squared contribution from feature $f_i$, and $\epsilon_{ij}$ is the contribution from the combination of features $f_i$ and $f_j$, and where i and j are any two features in the original features space.

As in section C.3, the contribution of each feature to a categorization decision is computed without ever performing feature space expansion. Given the nature of the problem presented in this section, the search for the best feature is less computationally restrictive. Thus, if the search is restricted to those features in a specific document, an exhaustive search may be performed since there tends to be only a small fraction of the vocabulary present in the current document (e.g., for one corpus, fifty-three words on average). Consequently, the most important features may be extracted for each categorized document. In addition, implicit features (i.e., those features that are not found in a document) that may be relevant in categorizing a document may be identified using the technique described in section C.3 above.

D.3 PLC Models

As set forth above, the score in PLC models is based on the posterior class probability s(c,d)=P(c|d). In PLC there are three model parameters: class profile P(f|c), document contribution P(d|c), and class prior P(c). From these three model parameters the probability of the model to observe a feature or combination of features given a document P(f|d) may be computed. When categorizing a document, the posterior probability distribution P(c|d) is estimated by maximizing the likelihood of document d using the Expectation-Maximization (EM) algorithm (the details of which are disclosed by Dempster et al., "Maximum Likelihood From Incomplete Data Via The EM Algorithm", Journal of the Royal Statistical Society, Series B, 39(1):1-38, 1997, which is incorporated herein by reference). While it is difficult to relate P(c|d) with the frequencies of the different features in the current document being categorized since the EM algorithm is an iterative fixed-point algorithm, the fact that the posterior probability distribution P(c|d) may be obtained by maximizing the likelihood l(d) may be used to compute $\epsilon_f$ the contribution of feature f to a categorization decision.

The likelihood l(d), which is given by:

$$l(d) = \sum_f x_f \ln\left(\sum_c P(c)P(d|c)P(f|c)\right)$$

$$= \sum_f x_f \ln\left(\sum_c P(d)P(c|d)P(f|c)\right)$$

$$= \sum_f x_f \ln(P(d)) + \sum_f x_f \ln\left(\sum_c P(c|d)P(f|c)\right)$$

may be maximized under the constraint that $$\sum_c P(c|d) = 1$$

by maximizing the Lagrangian:

$$L = l(d) - \lambda\left(\sum_c P(c|d) - 1\right),$$

to yield:

$$\frac{\partial L}{\partial P(c|d)} = \sum_f x_f \frac{P(f|c)}{\sum_\alpha P(\alpha|d)P(f|\alpha)} - \lambda = 0,$$

or $$\sum_f \frac{x_f}{P(f|d)} P(f|c) = \lambda.$$

As the preceding equation is true for all classes c, it may be used to compute the contribution $\epsilon_f$ of feature f to a categorization decision of document d (i.e., the influence of a feature in favor of one class $c_1$ as opposed to another class $c_2$) using:

$$\forall c_1, c_2, \sum_f \frac{x_f}{P(f|d)}(P(f|c_1) - P(f|c_2)) = 0,$$

by defining the contribution $\epsilon_f$ of a selected feature f as a function of the product of its corresponding normalized feature value and the difference between feature profiles for two classes. Namely, the contribution $\epsilon_f$ (where the two classes $c_1$ and $c_2$ are compared to identify which features f are more typical than others features and where the contribution $\epsilon_f$) may be defined as:

$$\varepsilon_f = \frac{x_f}{P(f|d)}(P(f|c_1) - P(f|c_2)),$$

where:
P(f|c) is the feature profile for class c;
$\epsilon_f$ is the contribution of feature f to a categorization decision;
$c_n$ is a class n in which the document may be categorized;
d is the document being categorized;
$x_f$ is the feature value associated with the document for the feature f;

and where features with large contributions $\epsilon_f$ will have a large influence on the categorization in class $c_1$ or $c_2$ depending on their sign (i.e., features with a large positive contributions will have a large positive influence on a categorization decision and features with a large negative contributions will have a large negative influence on a categorization decision), and features with a near-zero contribution $\epsilon_f$ will indicate no preference towards either class $c_1$ or class $c_2$.

Similarly, the maximized likelihood l(d) may be used to evaluate the influence of a feature on one category as opposed to the average.

Given $$P(f) = \sum_c P(c)P(f|c),$$

$$\sum_f \frac{x_f}{P(f|d)}(P(f|c) - P(f)) = 0,$$

therefore the contribution $\epsilon_f$ of a selected feature f may be defined as a function of the product of its corresponding normalized feature value and the difference between a feature profile for a class and an average feature profile (where one class c is compared with an average feature distribution P(f)) as:

$$\varepsilon_f = \frac{x_f}{P(f|d)}(P(f|c) - P(f)),$$

where:
P(f|c) is the feature profile for class c;
P(f) is the marginal distribution of feature f (i.e., average feature profile);
$\epsilon_f$ is the contribution of feature f to a categorization decision;
c is a class in which the document may be categorized;
d is the document being categorized;
$x_f$ is the feature value associated with the document for the feature f.

E. Detailed Embodiments

Referring again to FIGS. 1-4, FIGS. 1-2 illustrate a first embodiment of a system that evaluates the contribution of features to a categorization decision. In the system shown in FIG. 1, a feature influence calculator (and optional highlighter) 114 use document-based feature selection to determine the influence of features in an input document 108 on its categorization decision 107. In addition, the features that influence the categorization decision 107 are optionally highlighted in a marked-up input document 116. It will be appreciated by those skilled in the art that there exists many alternate ways to highlight those features of an input document that are determined to influence the categorization decision, including but not limited to the use of a combination of one or more of color highlighting, pop-up windows, comments, color fonts, underlying, etc. In an alternate embodiment, the features of the input document 108 with the greatest influence are set forth in a ranked list that is output together with the marked-up input document 116 or separately on its own with the categorization decision 107.

Figure 2:
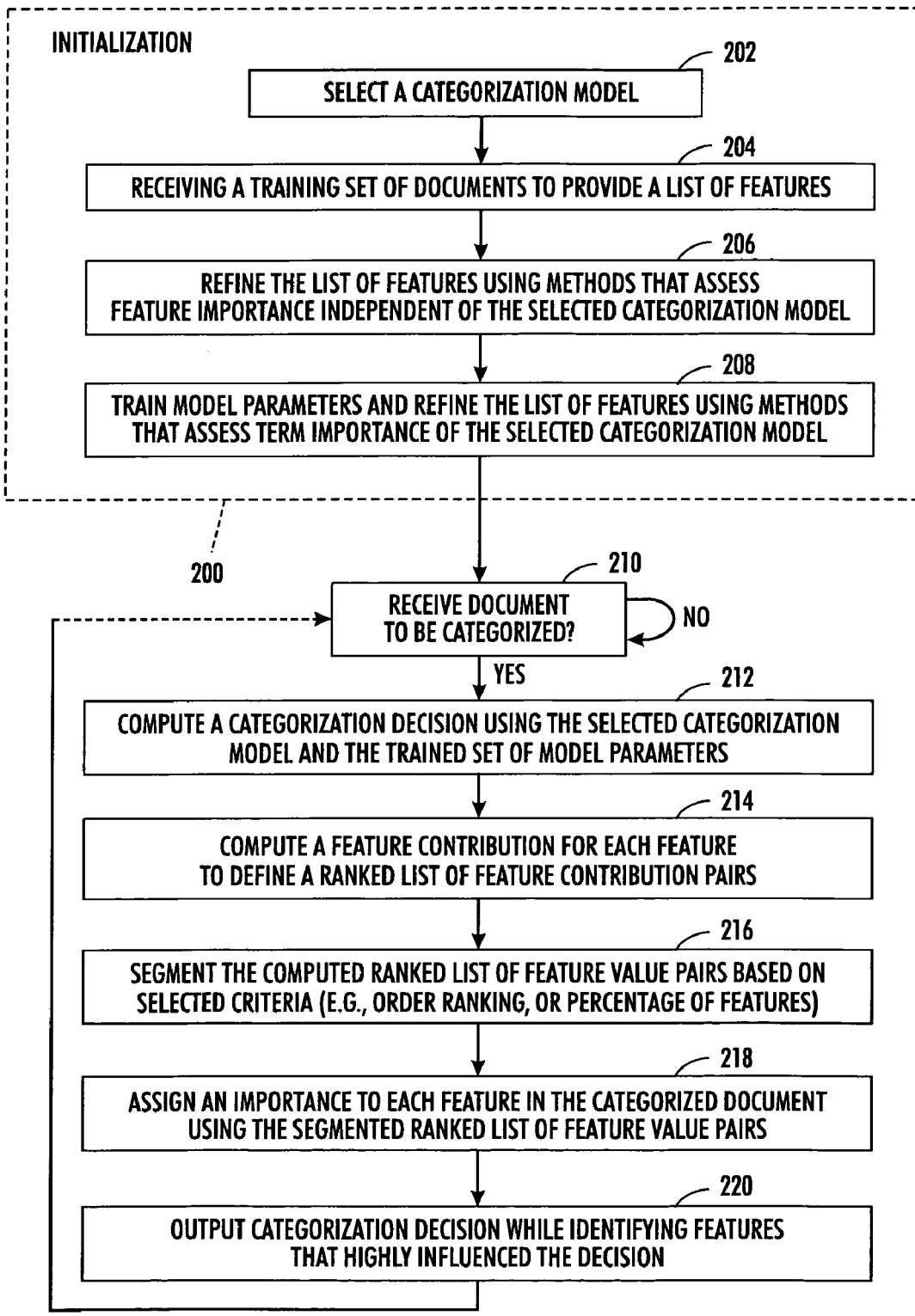
FIG. 2 is a flow diagram that sets forth a method for explaining a categorization decision in accordance with the embodiment shown in FIG. 1.

In one embodiment, the system shown in FIG. 1 operates according to the flow diagram set forth in FIG. 2. Initially, the categorizer 106 is initialized (at 200). Initialization of the categorizer 106 includes: the selection of the categorization model 101 (at 202); the receipt and use of the document training set 112 to provide a list of features 113 (at 204); the refinement of the list of features 113 using the model independent feature selector 102 that employs model-independent feature selection methods described in section B above to assess feature importance independent of the selected categorization model (at 206); and the training of model parameters 105 and the refinement of the ranked list of features (as shown in FIG. 3 at 103A and 103B) using the model-based feature selector and parameter trainer 104 that employs model-dependent feature methods described in section C above to assess the importance of features of the selected categorization model 101 (at 208).

Subsequent to the initialization of the categorizer 106 (at 200) that defines its categorization model 101 and model parameters 105, the categorizer 106 performs the operation 212 and the feature influence calculator and highlighter 114 performs the operations 214, 216, 218, and 220 upon receipt of a document 108 to be categorized that is defined by a set of feature value pairs 109. At 212, the categorizer 106 computes a categorization decision 107 for the set of feature value pairs 109 using the selected categorization model 101 and the model parameters 105. At 214, the calculator 114 computes a contribution for each feature (using the model parameters 105 and the set of feature value pairs 109) to define a ranked list of feature contribution pairs using the methods set forth in section D above, where each feature contribution pair is a function of the product of the difference between category model parameter values and the feature value.

The ranked list of feature contribution pairs (defined at 214) is segmented based on selected criteria (at 216) to define a segmented ranked list of feature value pairs. The selected criteria may include one or more of an ordered ranking or a percentage of feature value. In one embodiment, the segmented ranked list of feature value pairs assigns one of a high, medium, or low level of contribution to each feature. An importance is assigned to each feature in the categorized document using the segmented ranked list of feature value pairs (at 218). The categorization decision 107 is output together with a marked-up input document 116 indicating the influence of features on the categorization decision (at 220).

Figure 3:
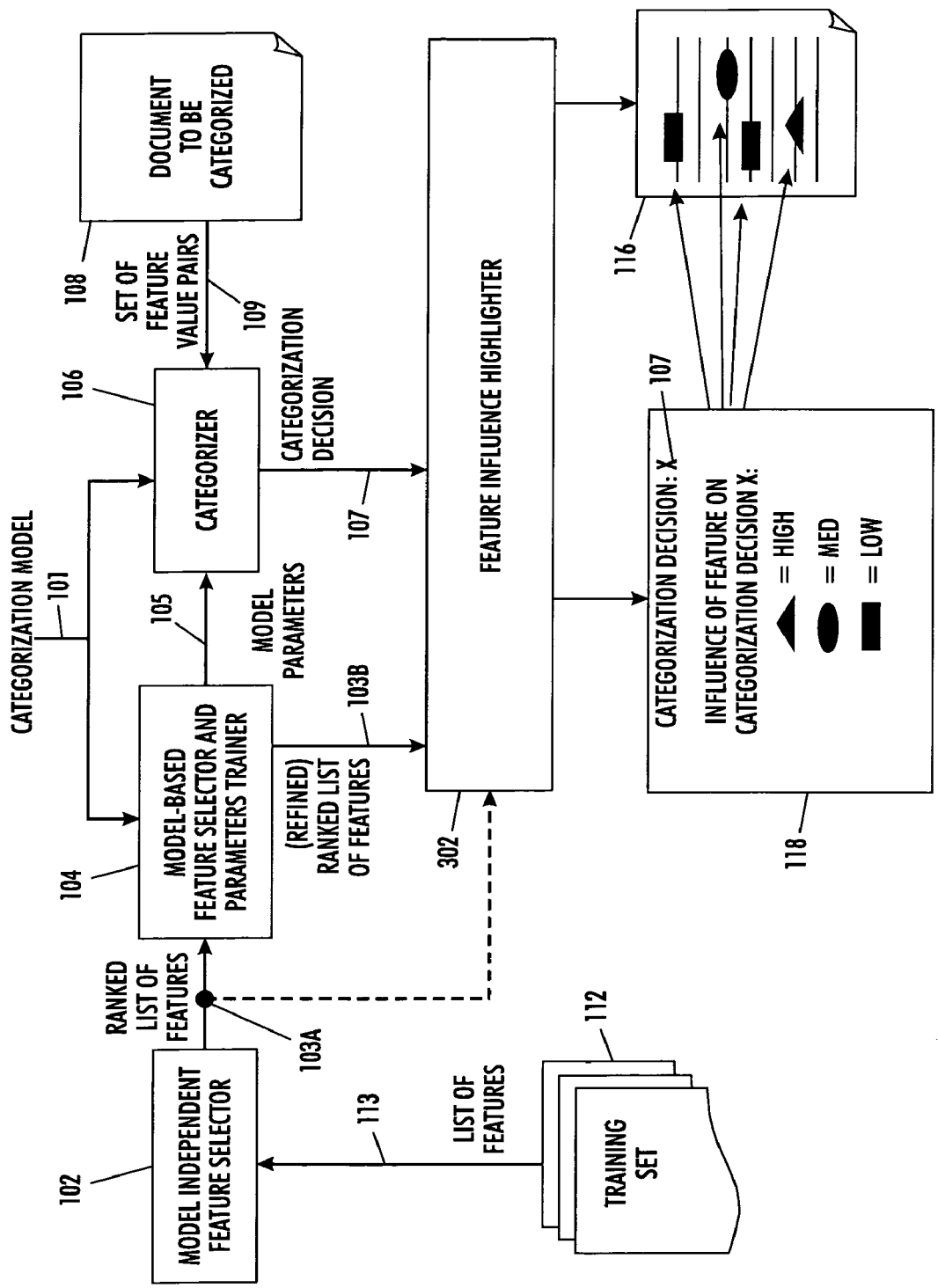
FIG. 3 illustrates a second embodiment of a system for explaining a categorization decision using model-independent or model-dependent feature selection.
Figure 4:
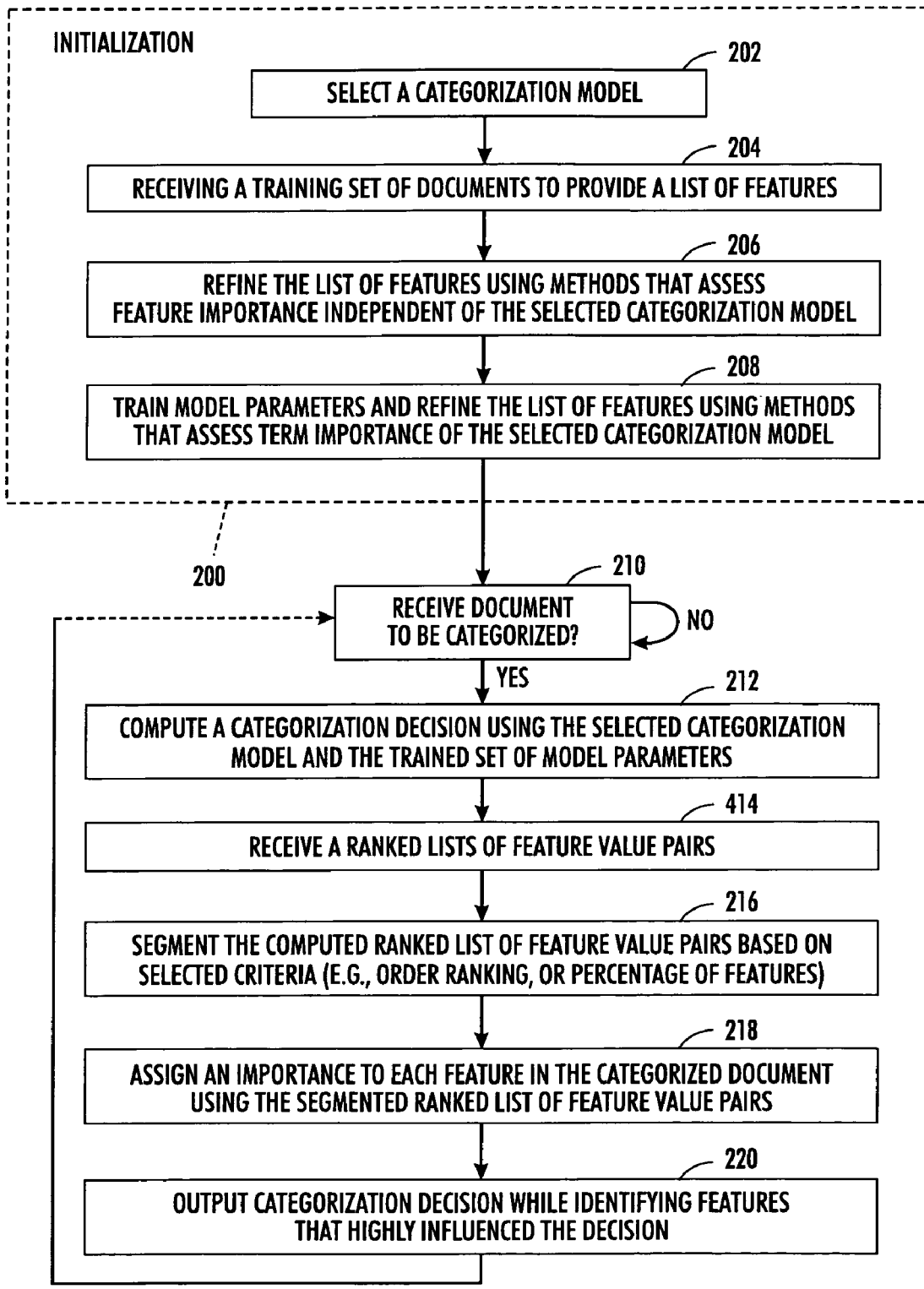
FIG. 4 is a flow diagram that sets forth a method for explaining a categorization decision in accordance with the embodiment shown in FIG. 3.

FIGS. 3-4 illustrate a second embodiment of a system 100 that evaluates a categorization decision. The system shown in FIG. 3 is similar to the system shown in FIG. 1 except that the highlighter calculator 114 shown in FIG. 1 is replaced with feature influence highlighter 302 shown in FIG. 3. The feature influence highlighter 302 receives as input a ranked list of features 103 and a categorization decision 107.

In one embodiment, the system shown in FIG. 3 operates according to the flow diagram set forth in FIG. 4. The flow diagram sets forth similar operations to those discussed above in FIG. 2 except in lieu of performing the operations at 214, the operations at 414 are performed instead. In one embodiment at 414, the feature influence highlighter 302 receives the (model-dependent) ranked list of features 103B from the model-based feature selector and parameter trainer 104 that is computed in accordance with the model-dependent feature selection methods set forth in section C. In another embodiment at 414, the feature influence highlighter 302 receives the ranked list of features 103A from the model independent feature selector 102 that is computed in accordance with the model-independent feature selection methods set forth in section B. Subsequently, the feature influence highlighter 302 uses the ranked list of feature value pairs as discussed above at 216, 218, and 220 to output a categorization decision 107 while identifying features in a marked-up input document 116 that influenced the categorization decision.

F. Miscellaneous

Those skilled in the art will recognize that a general purpose computer may be used for implementing certain elements of the systems and methods described herein. Such a general purpose computer would include hardware and software. The hardware would comprise, for example, a processor (i.e., CPU), memory (ROM, RAM, etc.), persistent storage (e.g., CD-ROM, hard drive, floppy drive, tape drive, etc.), user I/O, and network I/O. The user I/O can include a camera, a microphone, speakers, a keyboard, a pointing device (e.g., pointing stick, mouse, etc.), and the display. The network I/O may for example be coupled to a network such as the Internet. The software of the general purpose computer would include an operating system.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A computer implemented method for communicating an explanation of a categorization decision, comprising:
   computing a score for each class of a plurality of classes using model parameter values of a selected categorization model and feature values of a document to be categorized;
   computing a contribution $\epsilon_f$ each feature of a plurality of features in the document, where the contribution $\epsilon_f$ is computed using document-dependent feature selection and wherein the contribution $\epsilon_f$ of a selected feature f is a function of a product of a corresponding normalized feature value and difference between a feature profile for a class and an average feature profile;
   specifying a categorization decision using at least the class with a highest score;
   assigning an importance to said each feature of a plurality of the features using the computed contribution $\epsilon_f$ to identify for different ones of the plurality of features, an influence on the categorization decision; and
   providing a record of the explanation of the categorization decision that indicates the assigned importance of the plurality of features.

2. The method according to claim 1, wherein the contribution $\epsilon_f$ of a selected feature f is a function of the product of the corresponding normalized feature value and a difference between model parameter values of different classes of the selected feature.

3. The method according to claim 2, wherein the contribution $\epsilon_f$ for each feature is computed using following equation:

$$\sum_f \varepsilon_f = s(c_1, d) - s(c_2, d) = \sum_f w_f^{c_1} x_f - \sum_f w_f^{c_2} x_f = \sum_f (w_f^{c_1} - w_f^{c_2}) x_f,$$

where:
$\epsilon_f$ is the contribution $\epsilon_f$ of feature f to a categorization decision;
$c_n$ is a class n in which the document is categorized;
d is a document being categorized; $s(c_n, d)$ is a score of category $c_n$ as $c_n$ depends on a feature value x;
$x_f$ is feature value associated with the document for the feature f;
$w^c_f$ is a model parameter value for the feature f in a class c.

4. The method according to claim 3, wherein the categorization model is Naïve Bayes.

5. The method according to claim 3, wherein the categorization model is linear.

6. The method according to claim 1, wherein the contribution $\epsilon_f$ of a selected feature f is a function of a product of corresponding normalized feature value and a difference between feature profiles for two classes.

7. The method according to claim 6, wherein the contribution for each feature is computed using following equation:

$$\varepsilon_f = \frac{x_f}{P(f|d)}(P(f|c_1) - P(f|c_2)),$$

where:
P(f|c) is a feature profile for class c;
$\epsilon_f$ is the contribution $\epsilon_f$ of feature f to a categorization decision;
$c_n$ is a class n in which the document is categorized;
d is a document being categorized;
$x_f$ is the feature value associated with the document for the feature f.

8. The method according to claim 1, wherein the contribution $\epsilon_f$ for each feature is computed using following equation:

$$\varepsilon_f = \frac{x_f}{P(f|d)}(P(f|c) - P(f)),$$

where:
P(f|c) is a feature profile for class c;
P(f) is marginal distribution of feature f;
$\epsilon_f$ is the contribution $\epsilon_f$ of feature f to a categorization decision;
c is a class in which document is categorized;
d is a document being categorized;
$x_f$ is the feature value associated with the document for the feature f.

9. The method according to claim 1, wherein the contribution $\epsilon_f$ for each feature is computed using following equation:

$$\varepsilon_i = \sqrt{2} w_i x_i = \frac{1}{2}(f(x_i 1_i) - f(-x_i 1_i)),$$

$$\varepsilon_{ii} = w_{ii} x_i^2 = \frac{1}{2}(f(x_i 1_i) + f(-x_i 1_i)) - f(0),$$

$$\varepsilon_{ij} = \sqrt{2} w_{ij} x_i x_j = (f(x_i 1_i + x_j 1_j) - f(x_i 1_i) - f(x_j 1_j) + f(0)),$$

where $\epsilon_i$ is frequency contribution from feature $f_i$, $\epsilon_{ii}$ is a squared contribution from feature $f_i$, and $\epsilon_{ij}$ is the contribution $\epsilon_f$ from the combination of features $f_i$ and $f_j$, and where i and j are any two features in an original feature space.

10. The method according to claim 9, wherein categorization model is Support Vector Machines.

11. The method according to claim 1, wherein the importance is assigned by segmenting a ranked list of feature contributions.

12. The method according to claim 11, wherein the ranked list of feature contributions is segmented based on selected criteria.

13. The method according to claim 12, wherein each segment is assigned one of a high, medium, or low level of contribution.

14. The method according to claim 1, wherein the categorization model is Probabilistic Latent Categorization.

15. The method according to claim 1, wherein a record of the explanation of the categorization decision that indicates the assigned importance of that plurality of features comprises a marked up input document indicating influence of features on the categorization decision.

16. A computer implemented method for communicating an explanation of a categorization decision, comprising:

computing a score for each class of a plurality of classes using model parameter values of a selected categorization model and feature values of a document to be categorized;

computing a contribution for each feature of a plurality of features in a document, where the contribution is computed using model-dependent feature selection;

specifying a categorization decision using at least a class with a highest score;

assigning an importance to said each feature of a plurality of the features using the computed contribution to identify for different ones of the plurality of features, an influence of said each feature on the categorization decision;

providing a record of the explanation of the categorization decision that indicates assigned importance of the plurality of features;

wherein the contribution is computed by computing contribution $\epsilon_f$ of feature f to a categorization decision using:

$$\varepsilon_i = w_i = \frac{1}{2\sqrt{2}}(f(1_i) - f(-1_i)),$$

$$\varepsilon_{ii} = w_{ii} = \frac{1}{2}(f(1_i) + f(-1_i)) - f(0),$$

$$\varepsilon_{ij} = w_{ij} = \frac{1}{\sqrt{2}}(f(1_i + 1_j) - f(1_i) - f(1_j) = f(0)),$$

where
- $\epsilon_i$ is frequency contribution from feature $f_i$,
- $\epsilon_{ii}$ is squared contribution from feature $f_i$, and
- $\epsilon_{ij}$ is a contribution from the combination of features and $f_i$ and $f_j$,
- i and j are any two features in an original feature space.

17. The method according to claim 16, wherein the importance is assigned by segmenting a ranked list of feature contributions.

18. The method according to claim 17, wherein the ranked list of feature contributions is segmented based on selected criteria.

19. The method according to claim 17, wherein each segment is assigned one of a high, medium, or low level of contribution.

* * * * *